United States Patent [19]

Nishizawa

[11] Patent Number: 4,827,466
[45] Date of Patent: May 2, 1989

[54] INFORMATION SIGNAL RECORDING MEDIUM ELECTROSTATIC CAPACITANCE TYPE

[75] Inventor: Akira Nishizawa, Yokohama, Japan

[73] Assignee: Victor Company of Japan, Ltd., Japan

[21] Appl. No.: 898,778

[22] Filed: Aug. 19, 1986

Related U.S. Application Data

[63] Continuation of Ser. No. 595,288, Apr. 2, 1984, abandoned, which is a continuation of Ser. No. 889,929, Mar. 24, 1978, abandoned.

[51] Int. Cl.⁴ .............................................. G11B 11/08
[52] U.S. Cl. ...................... 369/126; 252/511; 260/998.16; 346/151; 346/153.1; 358/342; 358/344; 365/102; 369/276; 369/288
[58] Field of Search ............... 358/344, 335, 342, 297; 369/276, 126, 283, 286, 288; 365/102; 346/151, 153.1, 137, 77 E, 76 L; 260/998.16; 252/511, 510

[56] References Cited

U.S. PATENT DOCUMENTS

| | | | |
|---|---|---|---|
| 377,066 | 11/1887 | Tucker | 369/276 |
| 2,310,998 | 2/1943 | Sawyer | 162/219 |
| 2,997,451 | 8/1961 | Miller | 369/276 |
| 3,072,543 | 1/1963 | Lubow | 369/276 |
| 3,111,495 | 11/1963 | Murphy | 252/511 |
| 3,787,873 | 1/1974 | Sato | 346/76 L |
| 3,842,217 | 10/1974 | Clemens | 369/126 |
| 3,855,426 | 12/1974 | Bouwhuis | 369/111 |
| 4,151,132 | 4/1979 | Khanna | 369/276 |
| 4,322,836 | 3/1982 | Kinjo | 369/43 |
| 4,331,976 | 5/1982 | Kinjo | 369/43 |
| 4,561,087 | 12/1985 | Fox | 369/126 |

FOREIGN PATENT DOCUMENTS

| | | | |
|---|---|---|---|
| 137631 | 3/1947 | Australia | 369/276 |
| 1181275 | 11/1964 | Fed. Rep. of Germany | 369/276 |
| 2502974 | 1/1976 | Fed. Rep. of Germany | 369/126 |
| 114412 | 10/1979 | Japan | 369/276 |

*Primary Examiner*—Steven L. Stephan
*Attorney, Agent, or Firm*—Handal & Morofsky

[57] ABSTRACT

A recording medium of electrostatic capacitance type is recorded with an information signal thereon as variation of geometrical shape of the recording surface part of the recording medium. The signal is reproduced from the recording medium by the variation, in response to the variation of geometrical shape, of the electrostatic capacitance between an electrode of a reproducing stylus tracing relatively the recording surface of the medium and the surface part. At least the surface part of the recording medium having the geometric shape variation is formed by a synthetic resin into which an electroconductive material has been admixed. The synthetic resin forms an outer surface cover of the surface part of the medium thereby to prevent exposure of the electroconductive material to the outside.

7 Claims, 2 Drawing Sheets

INFORMATION SIGNAL RECORDING MEDIUM ELECTROSTATIC CAPACITANCE TYPE

CROSS REFERENCE TO RELATED APPLICATION

This application is a continuation of application Ser. No. 595,288, filed Apr. 2, 1984 now abandoned which is a continuation of the U.S. patent application Ser. No. 889,929 now U.S. Pat. No. 4,679,754 filed in the U.S. Patent and Trademark Office on Mar. 24, 1978, the disclosure of which is incorporated herein by reference.

BACKGROUND OF THE INVENTION

The present invention relates generally to information signal recording mediums of the electrostatic capacitance type on which an information signal is recorded as variation of geometrical shape and from which the signal thus recorded is reproduced by the variation in capacitance between the recording medium and an electrode of a tracing reproducing stylus. More particularly, the invention relates to an information signal recording medium of the electrostatic capacitance type in which the base structure thereof is formed from an electroconductive synthetic resin containing electroconductive substance.

An information signal recording medium of electrostatic capacitance type known heretofore is fabricated in the following manner. A synthetic resin is press molded by a stamper thereby to obtain a recording medium base structure on the surface of which variation of geometrical shape comprising a plurality of pits conforming to an information signal is formed. Next, a thin film of an electroconductive metal of a thickness of, for example, a number of hundreds of Ångströms (Å) is formed by evaporation deposition on the surface of this recording medium base structure. Then, on this electroconductive metal thin film, a thin film of a dielectric material of a thickness of, for example, of a number of hundreds Å is applied and formed by the glow-discharge method.

As a reproducing stylus having an electrode traces over the surface of a recording medium fabricated in this manner, the electrostatic capacitance between the electrode of the reproducing stylus and the metal thin film of the recording medium through the dielectric thin film or through the dielectric thin film and an air gap varies in response to the variation of the geometrical shape of the recording medium. The recorded signal is produced by a known method in response to this variation of the electrostatic capacitance.

In the fabrication of this known recording medium, however, process steps such as the step of evaporation deposition of an electroconductive metal thin film and the step of depositing a dielectric thin plate as described above are required in addition to the step of press molding the recording medium base structure. For this reason, a considerable quantity of production equipment and many complicated and troublesome process steps are required, whereby the production cost is high.

SUMMARY OF THE INVENTION

Accordingly, it is a general object of the present invention to provide a novel and useful information signal recording medium of electrostatic capacitance type in which the above described difficulties have been overcome.

Another and specific object is to provide an information signal recording medium of electrostatic capacitance type in which the recording medium base structure is formed from a synthetic resin containing an electroconductive material. By this provision according to the invention, electrostatic capacitance can be created between the surface of the recording medium and the electrode of the reproducing stylus as electrical insulation is maintained therebetween. For this reason, layers such as an electroconductive metal thin film and a dielectric thin film are not required as in a conventional recording medium. Accordingly, in the production of the recording medium of the invention, the only process step required is merely a press molding of a synthetic resin containing an electroconductive maerial, and process steps such as deposition of an electroconductive metal thin film and deposition of a dielectric thin film are not necessary as in the production of conventional recording mediums. Therefore, the recording medium of the invention can be produced very simply and at low cost.

Other objects and further features of the invention will be apparent from the following detailed description with respect to preferred embodiments of the invention when read in conjunction with the accompanying drawings.

DETAILED DESCRIPTION

Figure 1:
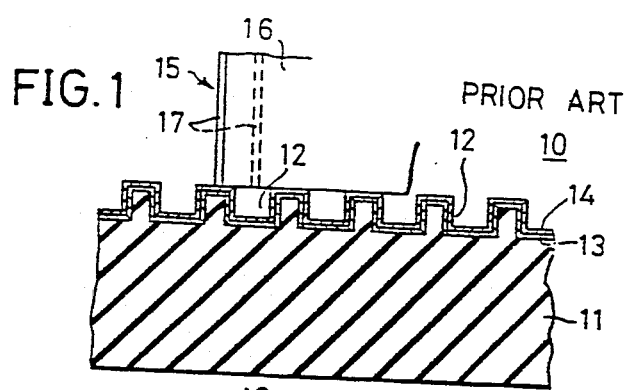
FIG. 1 is a fragmentary, enlarged sectional view of one examples of an information signal recording medium of electrostatic capacitance type known in the prior art.

As conducive to a full understanding of the present invention, one example of a known recording medium of the electrostatic capacitance type will first be described briefly for comparison purposes. An information signal recording medium of the electrostatic capacitance type known in the prior art has a construction as indicated in FIG. 1, for example. This recording medium 10 has a recording medium base structure 11 made of a vinyl chloride-vinyl acetate copolymer and is formed by press molding to have, on its surface, pits 12 conforming to a recorded information signal. An electroconductive metal thin film 13 is formed by being deposited on this surface of the recording medium base structure 11, and then, on this thin film 13, a dielectric thin film 14 of a thickness of, for example, 500 Å is formed by deposition.

When a reproducing stylus 15 traces the surface of this recording medium 10 of the above described construction, an electrode 17 secured to the rear surface of the reproducing stylus 15 successively confronts flat faces (or upper faces) and bottom faces of the pits 12 of the recording medium 10. The electrostatic capacitance between the electrode 17 and the metal thin film 13 through the dielectric material thin film 14 when the electrode is in the position indicated by full line in FIG. 1 differs from the electrostatic capacitance between the electrode 17 and the metal thin film 13 through the dielectric thin film 14 and the air space of the pit 12 when the electrode 17 is in the position indicated by broken line. Accordingly, as the reproducing stylus 15 traces over the surface of the recording medium 10, variation of the above mentioned electrostatic capacitance is obtained, and the recorded information signal is thus reproduced.

As mentioned hereinabove, the cost of producing this known recording medium has been high because of the necessity of providing the electroconductive metal thin film and the dielectric material thin film. Accordingly, the present invention is proposed as a solution to this problem.

Figure 2:
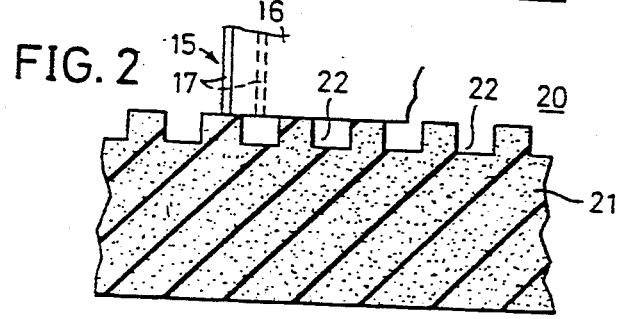
FIG. 2 is a view similar to FIG. 1 showing a first embodiment of the information signal recording medium of electrostatic capacitance according to the invention.
Figure 3:
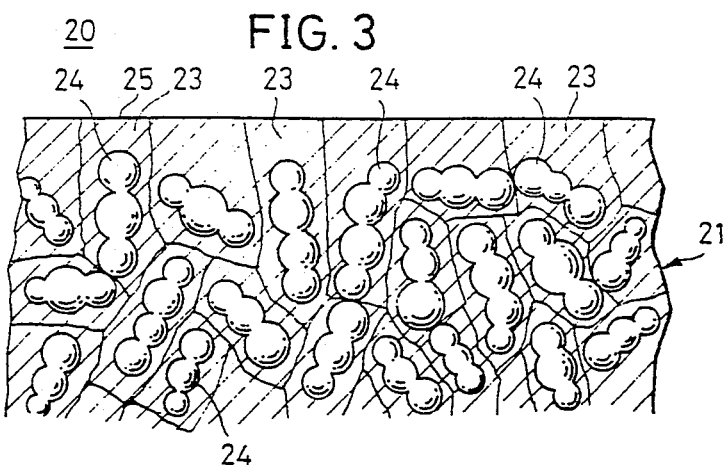
FIG. 3 is an enlarged view showing a part in the vicinity of the surface of the recording medium shown in FIG. 2.

One embodiment of the information signal recording medium of electrostatic capacitance type according to the present invention is illustrated in FIGS. 2 and 3. This recording medium 20 comprises essentially an electroconductive synthetic resin 21 having a composition as described hereinafter and press molded by a stamper to have pits 22 formed on its surface in conformance with a recorded information signal. The surface of this recording medium 20 is not provided with any films such as an electroconductive metal thin film or a dielectric material thin film as in a known recording medium.

Here, a specific embodiment of practice of a process for producing a synthetic resin starting material for use in the above mentioned press molding will be described.

First, a vinyl chloride-vinyl acetate copolymer resin as a thermoplastic resin and carbon black in powder form as an electroconductive material, for example, are charged in proportions described hereinafter into a mixer. The rotor of the mixer is rotated at a low speed of 750 to 800 rpm, for example, to mix the above specified resin and carbon black throughly for approximately 20 minutes. Next, plasticizers, stabilizers, and lubricants described hereinafter which have been previously mixed are charged into the mixer. The rotational speed of the rotor of the mixer is then raised to 900 to 1,000 rpm, at which the mixing is carried out for approximately 10 minutes.

Thereafter, the resulting resin with the carbon black, plasticzer, stabilizer, and lubricants admixed therewith is taken out of the mixer and kneaded for approximately 8 minutes by means of kneading rolls heated to a roll surface temperature of approximately 135° C. The resin thus kneaded and rendered into sheet form is removed from the kneading rolls, cooled, and thereafter introduced into a granulator, and is thereby formed into pellet forms of approximately 5 mm. square. This granulated resin is then introduced into an extruder and premolded. In this premolding step, the temperature within the cylinder of the extruder is caused to be 140° C., for example, and the temperature of the nozzle is caused to be 135° C.

The resin thus extruded from this extruder is press molded in a press machine provided with a stamper thereby to produce a recording medium as indicated in FIG. 2. During this process step, the press stamper temperature of the press machine is, for example, 175° C., and the press pressure is 140 kg./cm².

Next, the composition of the synthetic resin starting material to be press molded will be described with respect to specific embodiments of practice thereof.

| Mixture example I | percent by weight |
|---|---|
| (a) Vinyl chloride-vinyl acetate copolymer (as thermoplastic resin) (Nippon Zeon Co., Ltd. 400 X 150P) | 61.8% |
| (b) Carbon black (as electroconductive material) Mitsubishi Kasei Co., Ltd. MA600B or) Cabot Corp. U.S.A. CSX-99 | 30.9% |
| (c) Di-(2-ethylhexyl) phthalate (as plasticizer) | 3.7% |
| (d) Di butyl tin di laurate (as stabilizer) | 2.5% |
| (e) Calcium laurate (as stabilizer) | 0.6% |
| (f) Epoxidized soyabeans oil (as stabilizer) | 0.5% |

| Mixture example II | percent by weight |
|---|---|
| (a) Vinyl chloride-vinyl acetate copolymer (as thermoplastic resin) (Nippon Zeon Co., Ltd. 400 X 150P) | 76.6% |
| (b) Carbon black (as electroconductive material) (Akzo Chemie Netherland B.V.) | 15.3% |
| (c) Di-(2-ethylhexyl) phthalate (as plasticizer) | 3.8% |
| (d) Di butyl tin di laurate (as stabilizer) | 2.7% |
| (e) Calcium laurate (as stabilizer) | 0.8% |
| (f) Epoxidized soyabeans oil (as stabilizer) | 0.8% |

It has been found that the particles of the above specified carbon black are enveloped by molten resin at the time of heating and kneading with the vinyl chloride-vinyl acetate copolymer resin by means of kneading rolls. As a result, when the surface part of a recording medium 20 obtained by press molding in a press machine the starting material prepared as described above by kneading and premolding is magnified and examined, it appears as in FIG. 3. As shown, the carbon black particles 24 are disposed in mixed state within the vinyl chloride-vinyl acetate copolymer resin 23 of the electroconductive synthetic resin 21. Since the carbon black particles 24 are enveloped within the resin 23, there is no instance of exposure of carbon black particles at the surface 25 of the recording medium 20 obtained by press molding the mixture of the carbon black and resin. Between the surface 25 and the nearest carbon black particles, a layer of resin 23 of a thickness of a number of tens Å to a number of hundreds Å exists.

Accordingly, when a reproducing stylus 15 is caused to trace over the surface of the recording medium 20, electrostatic capacitance is created between the electrode 17 of the stylus 15 and the carbon black particles as the resin 23 at the surface part of the recording medium maintains electrical insulation between the electrode 17 and the carbon black particles 24. Therefore, as the reproducing stylus 15 traces over the surface 25 of the recording medium 20, and its electrode 17 successively confronts the flat faces (upper faces) and the bottom faces of the pits 22 of the recording medium, the electrostatic capacitance varies, and the recorded information signal is reproduced similarly as in the case of the known recording medium.

In the recording medium of the present invention, the carbon black particles 24 and the resin 23 respectively perform the functions of the metal thin film and the dielectric material thin film of the known recording medium. Therefore, in the production of the recording medium according to the invention, the process steps of forming these thin films are unnecessary, and only the simple step of press molding the synthetic resin containing carbon black is sufficient, whereby the recording medium can be produced easily an inexpensively. According to calculations, the cost of production of the recording medium of the present invention can be greatly reduced to approximately 1/10 of that of a conventional recording medium of equivalent characteristics.

When signals recorded on recording mediums according to the invention were reproduced, and the S/N ratios were measured, these S/N ratios were found to be from 45 to 46 dB, which are somewhat (3 to 4 dB) lower than the S/N ratios of 49 to 50 dB of the reproduced signals of a known recording medium with the above mentioned thin films. For practical purposes, however, this difference gives rise to no problems, and, therefore, it was verified that an amply high S/N ratio can be obtained.

Furthermore, the known recording medium is readily charged with static electricity. In the case where this recording medium has a large charge, there is the risk of dielectric breakdown of the dieletric material film and damaging of the electrode of the reproducing stylus due to discharging of this charge at the start of the reproducing operation. In contrast, the recording medium of the present invention is not readily charged with static electricity since the entire recording medium contains electroconductive particles, whereby the above described problem with static electricity does not arise.

Figure 4A:
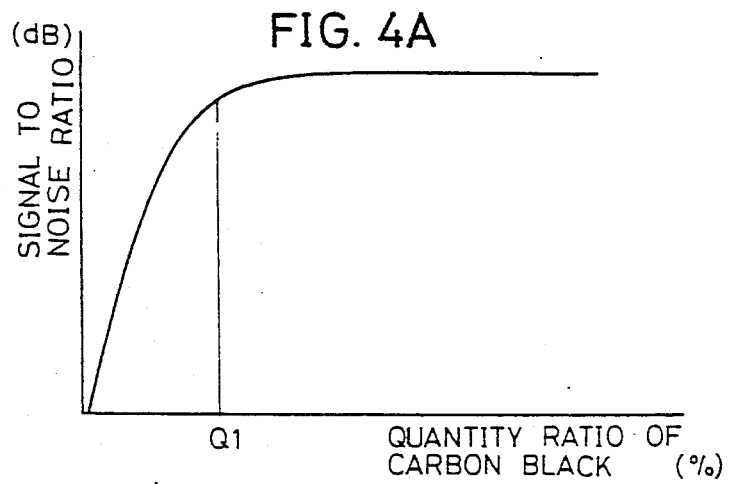
FIGS. 4A and 4B are, respectively, a graph indicating the relationship between the ratio of quantity of carbon black and the signal-to-noise (S/N) ratio of the reproduced signal, and a graph indicating the relationship between the ratio of quantity of carbon black and the volume resistivity of the resin containing the carbon black.
Figure 4B:
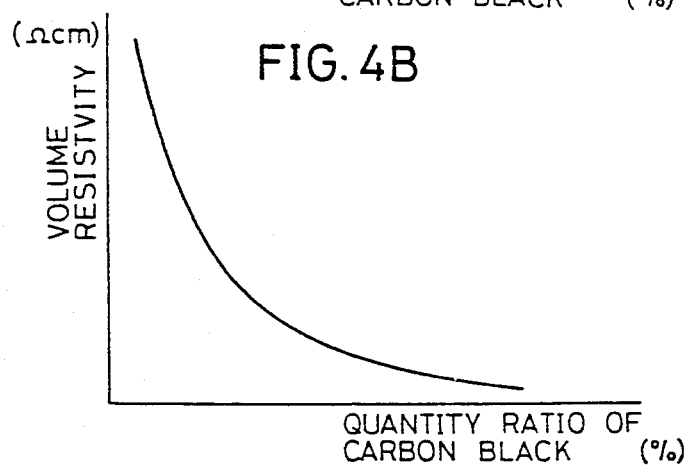

The proportion of the carbon black admixed into the thermoplastic resin will now be considered. The relationship of this mixing proportion and the S/N ratio of a signal reproduced from the recording medium is as indicated in FIG. 4A. It will be observed that the S/N ratios rises rapidly with increase in the content of the carbon black up to a certain quantity ratio $Q_1$ and thereafter does not rise very much with increase in the carbon black content until, finally, the S/N ratio becomes substantially constant. That is, this relationship is asymptotic. The relationship between the carbon black content and the volume resistivity is as indicated in FIG. 4B. It will be observed that, as the carbon black content increases from a low value, the volume resistivity initially decreases rapidly, but the rate of decrease becomes progressively less.

The S/N ratio of the reproduced signal can be increased by increasing the carbon black content, but if the quantity of the carbon black becomes too great, the thermoplastic characteristic of the thermoplastic resin will become poor, and forming of the resin will become difficult. Furthermore, in order to maintain electrical insulation between the electrode 17 of the reproducing stylus 15 and the carbon black particles 24 in the recording medium 20, it is necessary that the resin 23 exist as a layer at the surface of the recording medium. However, if the carbon black quantity is increased, the thickness of the resin 23 in this surface layer will be reduced. Therefore, when the insulation required for preventing dielectric breakdown of the resin between the electrode of the reproducing stylus and the carbon black particles is considered, it is estimated that a thickness of the surface layer of the resin of the order of a number of tens Å to a number of hundreds Å is necessary. Furthermore, as mentioned above, increasing the carbon black quantity above a certain quantity ratio ($Q_1$) does not result in a very great increase in the S/N ratio.

When these relationships are considered, it is seen that a carbon black content of approximate 60 percent by weight or less is desirable. On the other hand, in order to obtain a value of the S/N ratio of the reproduced signal which is satisfactory for practical purposes, it is desirable that the carbon black content be at least approximately 5 percent by weight in the case where a carbon black of good electroconductivity is used. Therefore, the carbon black content is from 5 to 60 percent by weight, preferably from 10 to 40 percent by weight.

In the above described embodiment of the invention, carbon black is used as the electroconductive material, but the invention is not thus limited, it being possible to use also other electroconductive materials such as silver powder and aluminum powder.

Figure 5:
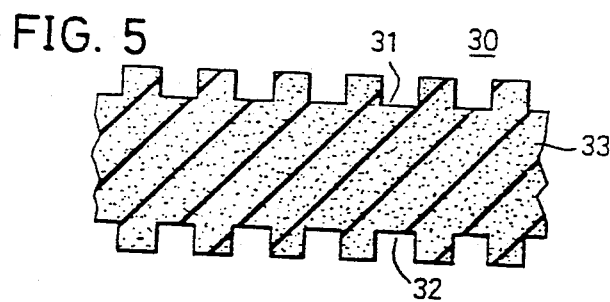
FIGS. 5 and 6 are views similar to FIG. 2 showing second and third embodiments of the recording medium according to the invention.

The recording medium 20 of the embodiment of the invention illustrated in FIG. 2 is recorded with an information signal by forming pits 22 on only the upper surface thereof, but information signals may also be recorded by forming pits 31 and 32 on the upper and lower surfaces as in the case of the recording medium 30 of the embodiment of the invention shown in FIG. 5. In this case, also, the synthetic resin 33 is made by press molding a thermoplastic resin with an admixed electroconductive material of a formulation as described above.

Figure 6:
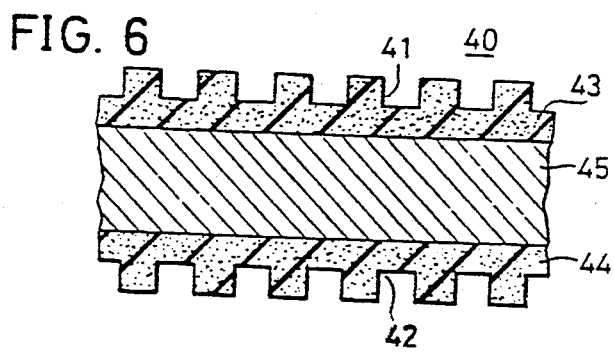

In still another embodiment of the invention as shown in FIG. 6, the quantity of the thermoplastic resin with an admixed electroconductive material is reduced to lower the production cost. For this purpose, the recording medium 40 is fabricated with a construction wherein other material such as paper 45 is interposed with intimate adherence between synthetic resin sheets 43 and 44 with admixed electroconductive materials, on which information signals are recorded by forming pits 41 and 42.

Further, this invention is not limited to these embodiments but various variations and modifications may be made without departing from the scope of the invention.

What is claimed is:

1. A method of retrieving an information signal, comprising the steps of:
   (a) mixing a conductive material with a resin to form a mixture, said mixture being formed by mixing a co-polymer of polyvinyl chloride and polyvinyl acetate with five to sixty weight percent of carbon black;
   (b) melting said mixture into the melting gelatin state to form a conductive resin;
   (c) providing a pressing machine with a mold having engraved thereon a surface for pressing an information bearing geometrical shape;
   (d) supplying said conductive resin in the melting gelatin state to said pressing machine;
   (e) press molding said conductive resin in the melting gelation state into an information signal recording surface having a layer of said resin developed thereon, said information being recorded as pits which are variations in said geometrical shape, said conductive resin in the melting gelation state being press molded to form at least one layer of said recording surface covering a paper; and (f) retrieving said information recorded as variations in geometrical shape as variations in electrostatic capacitance formed between said recording surface and an electrode provided on a stylus so as to confront said pits, said stylus passing over said variations in said geometrical shape and being directly in contact with said recording surface whereby said information is retrieved through the electrode as an electrical signal.

2. A method as in claim 1, further comprising the step of adding a lubricant to said mixture.

3. A method as in claim 1, wherein said mixture is formed by mixing conductive material, lubricant and a plasticizer together, heating said mixture and blending the ingredients together under the application of heat to cause melting of the mixture.

4. A method as claimed in claim 1, wherein said layer of said information signal recording surface has a thickness of tens to a number of hundreds of angstroms.

5. A method as claimed in claim 1, wherein said mixture is formed by mixing the co-polymer of polyvinyl chloride and polyvinyl acetate within a range of ten to forty weight percent of carbon black.

6. A method of reproducing an information signal, consisting of the following steps:
(a) mixing a conductive material with a resinous formulation to form a mixture;
(b) melting said mixture into the melting gelation state to form a conductive resin;
(c) providing a pressing machine with a mold having disposed thereon a molding surface for pressing an information bearing geometrical shape;
(d) supplying said resin in the melting gelation state to said pressing machine;
(e) press forming an information bearing geometrical shape into said resin by pressing said molding surface into said resin, said information being recorded as pressed variations in geometrical shape; and
(f) detecting said information recorded as pressed variations in geometrical shape by detecting variations in capacitance corresponding to said variations in geometrical shape using a stylus which passes over said variations in said geometrical shape and is directly in contact with material contained within said mixture.

7. A method of reproducing an information signal, consisting of the following steps:
(a) mixing materials comprising five to sixty percent carbonblack, plasticizer, stabilizer and lubricants, and vinyl chloride and vinyl acetate to form a mixture;
(b) melting said mixture into the melting gelation state to form a conductive resin incorporating a copolymer of polyvinyl chloride and polyvinyl acetate;
(c) providing a pressing machine with a mold having engraved thereon a molding surface for pressing an information bearing geometrical shape;
(d) supplying said resin in the melting gelation state to said pressing machine;
(e) press forming an information bearing recording surface and information bearing indentations into said resin by pressing said molding surface into said resin, said information corresponding to variations in said geometrical shape; and
(f) detecting said information recorded as variations in geometrical shape by detecting variations in capacitance corresponding to said variations in geometrical shape using a flat bottomed stylus which passes over said indentations in said geometrical shape and is directly in contact with the recording surface.

* * * * *